(12) United States Patent
Rochester et al.

(10) Patent No.: US 10,468,703 B2
(45) Date of Patent: Nov. 5, 2019

(54) POLYOZOMETALLATES FOR USE AT ELEVATED TEMPERATURES AND PRESSURES

(71) Applicant: University of Chester, Chester (GB)

(72) Inventors: David Lee Rochester, Runcorn (GB); Matthew Alexander Herbert, Runcorn (GB); Andrew Martin Creeth, Runcorn (GB)

(73) Assignee: University of Chester, Chester (GB)

( * ) Notice: Subject to any disclaimer, the term of this patent is extended or adjusted under 35 U.S.C. 154(b) by 0 days.

(21) Appl. No.: 14/900,537

(22) PCT Filed: Jun. 25, 2014

(86) PCT No.: PCT/GB2014/051945
§ 371 (c)(1),
(2) Date: Dec. 21, 2015

(87) PCT Pub. No.: WO2014/207465
PCT Pub. Date: Dec. 31, 2014

(65) Prior Publication Data
US 2016/0156059 A1 Jun. 2, 2016

(30) Foreign Application Priority Data

Jun. 25, 2013 (GB) .................................. 1311295.8

(51) Int. Cl.
*H01M 8/18* (2006.01)
*H01M 8/20* (2006.01)
(Continued)

(52) U.S. Cl.
CPC ........... *H01M 8/188* (2013.01); *H01M 4/483* (2013.01); *H01M 8/04186* (2013.01);
(Continued)

(58) Field of Classification Search
CPC ..................... H01M 8/04186; H01M 8/188
(Continued)

(56) References Cited

U.S. PATENT DOCUMENTS 8,574,534 B2 * 11/2013 Dai .................. C01B 31/00
423/445 R
2006/0024539 A1 2/2006 Dumesic
(Continued)

FOREIGN PATENT DOCUMENTS

WO 2007/110663 A2 10/2007
WO 2007/122431 A1 11/2007
(Continued)

OTHER PUBLICATIONS

Search report dated Dec. 20, 2013 from priority application No. GB 1311295.8.

*Primary Examiner* — Basia A Ridley
*Assistant Examiner* — James M Erwin
(74) *Attorney, Agent, or Firm* — Knobbe, Martens, Olson & Bear, LLP (57) ABSTRACT

The present invention relates to a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant in a regeneration zone after such reduction at the cathode, the catholyte solution further comprising one or more vanadium species that result from the speciation of the polyoxometallate at an elevated temperature and/or pressure, wherein the polyoxometallate is represented by the formula:

$$X_a[Z_bM_cO_d]$$

(Continued)

wherein X is selected from hydrogen, alkali metals, alkaline earth metals, ammonium, transition metal ions and combinations of two or more thereof; Z is selected from B, P, S, As, Si, Ge, Ni, Rh, Sn, Al, Cu, I, Br, F, Fe, Co, Cr, Zn, H2, Te, Mn and Se and combinations of two or more thereof; M comprises vanadium and optionally one or more of Mo, W, Nb, Ta, Mn, Fe, Co, Cr, Ni, Zn Rh, Ru, Tl, Al, Ga, In and other metals selected from the 1st, 2nd and 3rd transition metal series and the lanthanide series and combinations of two or more thereof; a is a number of X necessary to charge balance the $[Z_b M_c O_d]$ anion; b is from 0 to 20; c is from 1 to 40; d is from 1 to 180; X includes an amount of a non-hydrogen cation and the molar ratio of the non-hydrogen cation to vanadium is more than 0 and less than 1.

35 Claims, 9 Drawing Sheets (51) Int. Cl.
*H01M 8/04186* (2016.01)
*H01M 4/48* (2010.01)
*H01M 8/1018* (2016.01)

(52) U.S. Cl.
CPC ...... *H01M 8/20* (2013.01); *H01M 2008/1095* (2013.01); *H01M 2300/002* (2013.01); *Y02E 60/528* (2013.01)

(58) Field of Classification Search
USPC .......................................................... 429/50
See application file for complete search history.

(56) References Cited

U.S. PATENT DOCUMENTS

2010/0297522 A1* 11/2010 Creeth ............... H01M 8/188
429/479
2012/0052340 A1* 3/2012 la O' .................. H01M 12/085
429/51
2013/0071702 A1* 3/2013 Longman ........... B01F 3/04262
429/50

FOREIGN PATENT DOCUMENTS

WO 2009/037513 A1 3/2009
WO 2009/040577 A1 4/2009

* cited by examiner

Figure 9 ns. In its sim-
POLYOZOMETALLATES FOR USE AT ELEVATED TEMPERATURES AND PRESSURES

CROSS-REFERENCE TO RELATED APPLICATION

This application is the U.S. National Phase under 35. U.S.C. § 371 of International Application PCT/GB2014/051945, filed Jun. 25, 2014, which claims priority to UK Patent Application No. 1311295.8, filed Jun. 25, 2013. The disclosures of the above-described applications are hereby incorporated by reference in their entirety.

FIELD OF THE INVENTION

The present invention relates to fuel cells for use at elevated temperatures and pressures (ETP), in particular to indirect or redox fuel cells which have applications in microfuel cells for electronic and portable electronic components, and also in larger fuel cells for the automotive industry. The invention also relates to certain catholyte solutions for use in such fuel cells and the use of the cells themselves.

BACKGROUND OF THE INVENTION

Fuel cells have been known for portable applications such as automotive and portable electronics technology for very many years, although it is only in recent years that fuel cells have become of serious practical consideration. In its simplest form, a fuel cell is an electrochemical energy conversion device that converts fuel and oxidant into reaction product(s), producing electricity and heat in the process. In one example of such a cell, hydrogen is used as fuel, air or oxygen as an oxidant and the product of the reaction is water. The gases are fed respectively into catalysing, diffusion-type electrodes separated by a solid or liquid electrolyte which carries electrically charged particles between the two electrodes. In an indirect or redox fuel cell, the oxidant (and/or fuel in some cases) is not reacted directly at the electrode but instead reacts with the reduced form (oxidized form for fuel) of a redox couple to oxidise it and this oxidised species is fed to the cathode.

An acknowledged problem concerning electrochemical fuel cells is that the theoretical potential of a given electrode reaction under defined conditions can be calculated but never completely attained. Imperfections in the system inevitably result in a loss of potential to some level below the theoretical potential attainable from any given reaction. Previous attempts to reduce such imperfections include the selection of catholyte additives which undergo oxidation-reduction reactions in the catholyte solution. For example, U.S. Pat. No. 3,294,588 discloses the use of quinones and dyes in this capacity. Another redox couple which has been tried is the vanadate/vanadyl couple, as disclosed in U.S. Pat. No. 3,279,949.

Several types of proton exchange membrane fuel cells exist. For example, in U.S. Pat. No. 4,396,687 a fuel cell is disclosed which comprises regenerable anolyte and catholyte solutions. The anolyte solution is one which is reduced from an oxidised state to a reduced state by exposure of the anolyte solution to hydrogen. According to U.S. Pat. No. 4,396,687, preferred anolyte solutions are tungstosilicic acid ($H_4SiW_{12}O_{40}$) or tungstophosphoric acid ($H_3PW_{12}O_{40}$) in the presence of a catalyst.

The preferred catholyte solution of U.S. Pat. No. 4,396,687 is one which is re-oxidised from a reduced state to an oxidized state by direct exposure of the catholyte solution to oxygen. The catholyte of U.S. Pat. No. 4,396,687 includes a mediator component comprising a solution of $VOSO_4$. The mediator functions as an electron sink which is reduced from an oxidation state of $V^{(V)}$ to $V^{(IV)}$. The catholyte also includes a catalyst for regenerating the mediator to its oxidised state, $(VO_2)_2SO_4$. The catalyst present in the catholyte of U.S. Pat. No. 4,396,687 is a polyoxometallate (POM) solution, namely $H_5PMo_{12}V_2O_{40}$.

Besides U.S. Pat. No. 4,396,687, a number of other attempts to use oxometallate catalysts have been made. For example, in U.S. Pat. No. 5,298,343, cathode systems comprising solid metal catalysts, oxometallates and metallic acids, such as molybdic acid are disclosed.

In addition, WO 96/31912 describes the use of embedded polyoxometallates in an electrical storage device. The redox nature of the polyoxometallate is employed in conjunction with carbon electrode material to temporarily store electrons.

The basic structure of the fuel cells used with the present invention is disclosed in EP1866997. The fuel cells disclosed herein comprise an anode and a cathode separated by an ion selective polymer electrolyte membrane, the cathode comprising a cathodic material and a proton-conducting polymeric material; means for supplying a fuel to the anode region of the cell; means for supplying an oxidant to the cathode region of the cell; means for providing an electrical circuit between the anode and the cathode; a non-volatile redox couple in solution in flowing fluid communication with the cathode, the redox couple being at least partially reduced at the cathode in operation of the cell, and at least partially re-generated by reaction with the oxidant after such reduction at the cathode. The examples disclose that the catholyte is maintained at 50° C.

EP1999811 discloses the redox fuel cells as used in the present invention, in combination with a polyoxometallate. This application discloses fuel cells that comprise an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant after such reduction at the cathode, the catholyte solution comprising at least about 0.075M of the said polyoxometallate.

Zhizhina, E. G.; Simonova, M. V.; Odyakov, V. F.; Matveev, K. I. *Applied Catalysis A: General* 2007, 319, 91-97 discloses an increase in rate of redox potential of polyoxometallates at increased temperatures (100, 120, 130, 140, 150, 160° C.) under a $P_{O2}$ of 4 atm for chemical synthesis applications. The paper then goes on to state that "increasing temperature, rate and depth of regeneration of any HPA by dioxygen highly grow". However, the same paper also indicates that temperatures above 140° C. and preferably above 160° C. are beneficial. The aqueous polyoxometallate solutions disclosed herein are complex equilibrium systems containing different anions and cations.

Odyakov, V. F.; Zhizhina, E. G.; Maksimovskaya, R. I. *Applied Catalysis A: General* 2008, 342, 126-130 discloses that the regeneration of the polyoxometallate materials above requires "harder conditions" of 150-170° C. and $P_{O2}$ of 2-4 atm. Zhizhina, E. G.; Odyakov, V. F. *Applied Catalysis A: General* 2009, 358, 254-258 describes a temperature of 150-160° C. being required for the re-oxidation of the polyoxometallate catalyst to proceed efficiently. Further, the regeneration conditions for the polyoxometallate catalyst used are a temperature of 170° C. and a $P_{O2}$ of 4 atm.

Our own PCT/GB2013/051675 discloses the use of $Na_4H_3PV_4Mo_8O_{40}$ and also of "acid POMs" (i.e. polyoxometallates containing no non-hydrogen cations) in fuel cells at elevated temperature and/or pressure.

Certain prior art fuel cells all suffer from one or more of the following disadvantages: they are inefficient; they are expensive and/or expensive to assemble; they use expensive and/or environmentally unfriendly materials; they yield inadequate and/or insufficiently maintainable current densities and/or cell potentials; they are too large in their construction; they produce unwanted by-products and/or pollutants and/or noxious materials; and they have not found practical, commercial utility in portable applications such as automotive and portable electronics. With respect to our prior disclosures of POM systems, we seek to improve cell performance and identify new classes of POM systems and optimal operating conditions with respect to them to provide enhanced fuel cell systems.

SUMMARY OF THE INVENTION

It is an object of the present invention to overcome or ameliorate one or more of the aforesaid disadvantages and/or achieve one or more of those goals.

Accordingly, the present invention provides a redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant in a regeneration zone after such reduction at the cathode, the catholyte solution further comprising one or more vanadium species that result from the speciation of the polyoxometallate at an elevated temperature and/or pressure, wherein the polyoxometallate is represented by the formula:

wherein:

X is selected from hydrogen, alkali metals, alkaline earth metals, ammonium, transition metal ions and combinations of two or more thereof;

Z is selected from B, P, S, As, Si, Ge, Ni, Rh, Sn, Al, Cu, I, Br, F, Fe, Co, Cr, Zn, H2, Te, Mn and Se and combinations of two or more thereof;

M comprises vanadium and optionally one or more of Mo, W, Nb, Ta, Mn, Fe, Co, Cr, Ni, Zn Rh, Ru, TI, Al, Ga, In and other metals selected from the 1st, 2nd and 3rd transition metal series and the lanthanide series and combinations of two or more thereof;

a is a number of X necessary to charge balance the $[Z_bM_cO_d]$ anion;

b is from 0 to 20;

c is from 1 to 40;

d is from 1 to 180; and wherein

X includes an amount of a non-hydrogen cation and the molar ratio of the non-hydrogen cation to vanadium is more than 0 and less than 1.

Conventional thinking was that the optimum temperature for operation was 80° C., as performance was thought to decrease at higher temperatures, due to the decrease of oxygen solubility to zero as the boiling point of the catholyte is approached. However, increasing the temperature and/or pressure causes speciation of the polyoxometallate species, which increases the regeneration rate of the polyoxometallate. By speciation, it is meant that the vanadium species at one point was part of a polyoxometallate structure. This causes improvements in steady state performance as the catholyte is less reduced under the same load. This also increases the redox potential of the polyoxometallate, which results from a dynamic equilibrium between oxidation (occurring via regeneration) and reduction (occurring at the fuel cell electrode).

Increasing the temperature of the fuel cell is thought to have various advantages, such as reducing the catholyte viscosity, increasing ionic conductivity in the catholyte, increasing ionic conductivity in the membrane and increasing diffusion rates for all species. Increased pressure is thought to increase the maximum concentration of dissolved oxygen, thereby improving oxidation rates.

It was surprisingly found that the use of polyoxometallate species that contain non-hydrogen cations in low amounts resulted in an improved performance at increased temperatures and pressures. It was previously known that these polyoxometallates had a relatively poor performance in standard fuel cells. However, a dramatic improvement in performance is seen when used in the fuel cells of the present invention. Further, such polyoxometallates were found in many cases to demonstrate a better performance than other known polyoxometallate species in fuel cells of the present invention.

By low amounts of non-hydrogen cations, it is meant that the molar ratio of the non-hydrogen cation to vanadium is more than 0 and less than 1. Preferably, the molar ratio of the non-hydrogen cation to vanadium is more than 0 and less than 1, more preferably more than 0 and 0.75 or less, even more preferably more than 0 and 0.5 or less, and most preferably more than 0 and 0.25 or less.

Optionally, there may be more than one type of non-hydrogen cation in the polyoxometallate, i.e. X may comprise more than one type of non-hydrogen cation. In this case, the total molar ratio of all of the non-hydrogen cations to vanadium may be more than 0 and less than 1 and more preferably more than 0 and 0.75 or less, even more preferably more than 0 and 0.5 or less, and most preferably more than 0 and 0.25 or less. Alternatively or as well, the molar ratio of each type of non-hydrogen cation to vanadium may preferably be more than 0 and less than 1 and more preferably more than 0 and 0.75 or less, even more preferably more than 0 and 0.5 or less, and most preferably more than 0 and 0.25 or less.

Preferred ranges for b are from more than 0 to 10, more preferably from 1 to 5 and most preferably from 1.1 to 5.

Preferred ranges for c are from 5 to 20, more preferably from 10 to 18, and most preferably 12.

Preferred ranges for d are from 30 to 70, more preferably 34 to 62, and most preferably 40 to 50.

The values for a, b, c and d are not necessarily integers.

Phosphorus is particularly preferred for Z.

A combination of vanadium and either molybdenum or tungsten is particularly preferred for M. The molar ratio of molybdenum or tungsten to vanadium is preferably 2:1.

Preferably, the polyoxometallate contains from 2 to 10 vanadium centres.

A combination of hydrogen and an alkali metal and/or alkaline earth metal is particularly preferred for X. One such preferred combination is hydrogen and sodium.

Specific examples of polyoxometallates for use in the present invention include $KH_6PV_4Mo_8O_{40}$, $NaH_6PV_4Mo_8O_{40}$ and $K_{0.5}H_{9.5}P_2V_4Mo_8O_{44}$.

Preferably, the speciation of the polyoxometallate occurs in situ.

The elevated temperature is preferably above 80° C. and even more preferably above 90° C., 100° C. or 110° C. However, certain membranes used in the fuel cell of the present invention may become damaged at above 120° C. The elevated pressure is preferably above ambient pressure. More preferably, the elevated pressure is above 0.5 barG, above 0.75 barG, above 1 barG, above 1.25 barG or above 1.5 barG. Elevated pressures of from about 1.5 barG to about 2.5 barG, for example from around 1.75 barG to about 2.25 barG, for example around 2 barG pressure are preferred. The elevated pressure is also preferably below 2.5 barG pressure. BarG pressure means guage pressure and is defined as the pressure above ambient (atmospheric) pressure. In a further embodiment, both elevated temperature and pressure are used. This provides further benefits as the increase in pressure allows for a greater increase in temperature than would otherwise be possible, as the catholyte temperature is limited by its boiling point. The elevated temperature is therefore preferably below the boiling point for the catholyte solution.

The elevated temperature is preferably in the regeneration zone and/or in the cathode/anode region of the cell. More preferably, the elevated temperature is in the regeneration zone. Further, the elevated pressure is preferably in the regeneration zone and/or in the cathode/anode region of the cell. More preferably, the elevated pressure is in the regeneration zone.

Preferably the cell is maintained in operation thereof (in the regeneration zone and/or the cathode/anode region as mentioned above) at elevated temperature and/or pressure, preferably at elevated temperature and pressure, preferably as defined hereinabove.

The concentration of the polyoxometallate in the catholyte solution is preferably at least about 0.075M or 0.08M, more preferably at least about 0.1M, still more preferably at least about 0.125M and most preferably at least about 0.15M.

In one preferred embodiment of the invention, the ion selective PEM is a cation selective membrane which is selective in favour of protons versus other cations.

The cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-typeion exchange resins include perfluorocarboxylic acid resins, perfluorosulfonic acid resins and the like. Perfluorosulfonic acid resins are preferred, for example "Nafion" (Du Pont Inc.), "Flemion" (Asahi Gas Ltd), "Aciplex" (Asahi Kasei Inc) and the like. Non-fluororesin-type ion exchange resins include polyvinyl alcohols, polyalkylene oxides, styrene-divinylbenzene ion exchange resins and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytriflurostyrene sulphonic, sulphonated trifluorostyrene, sulphonated copolymers based on α,β, β triflurostyrene monomer and radiation-grafted membranes. Non-fluorinated membranes include sulphonated poly (phenylquinoxalines), poly (2,6 diphenyl-4-phenylene oxide), poly(arylether sulphone), poly(2,6-diphenylenol), acid-doped polybenzimidazole, sulphonated polyimides, styrene/ethylene-butadiene/styrene triblock copolymers, partially sulphonated polyarylene ether sulphone, partially sulphonated polyether ether ketone (PEEK) and polybenzyl suphonic acid siloxane (PBSS).

The proton exchange membrane fuel cell of the present invention may work in the following way:

a) $H^+$ ions are formed at an anode situated adjacent to a proton exchange membrane;

b) the catholyte with its redox couple in an oxidised state is supplied to a cathode situated oppositely adjacent to the proton exchange membrane;

c) the catholyte is allowed to become reduced upon contact with the cathode concomitantly with $H^+$ ions passing through the membrane to balance charge;

d) the catholyte may be passed from the cathode to a reoxidation zone wherein the catholyte is reoxidised; and e) the catholyte may then be passed from the reoxidation zone to the catholyte reservoir.

In a preferred embodiment, the catholyte is supplied from a catholyte reservoir.

The cell may be cyclic and the catholyte can be repeatedly oxidised and reduced without having to be replaced.

The fuel cell of the invention may comprise a reformer configured to convert available fuel precursor such as LPG, LNG, gasoline or low molecular weight alcohols into a fuel gas (eg hydrogen) through a steam reforming reaction. The cell may then comprise a fuel gas supply device configured to supply the reformed fuel gas to the anode chamber It may be desirable in certain applications of the cell to provide a fuel humidifier configured to humidify the fuel, eg hydrogen. The cell may then comprise a fuel supply device configured to supply the humidified fuel to the anode chamber.

An electricity loading device configured to allow the fuel cell to provide electric power may also be provided in association with the fuel cell of the invention.

Preferred fuels include hydrogen; low molecular weight alcohols, aldehydes and carboxylic acids; sugars and biofuels as well as LPGLNG or gasoline.

Preferred oxidants include air, oxygen and peroxides

The anode in the redox fuel cell of the invention may for example be a hydrogen gas anode or a direct methanol anode; other low molecular weight alcohols such as ethanol, propanol, dipropylene glycol; ethylene glycol; aldehydes formed from these; and acid species such as formic acid, ethanoic acid etc. In addition, the anode may be formed from a bio-fuel cell type system where a bacterial species consumes a fuel and either produces a mediator which is oxidized at the electrode, or the bacteria themselves are adsorbed at the electrode and directly donate electrons to the anode.

The cathode in the redox fuel cell of the invention may comprise as cathodic material carbon, gold, platinum, nickel or a metal oxide species. However, it is preferable that expensive cathodic materials are avoided and therefore preferred cathodic materials include carbon, nickel and metal oxide. One preferable material for the cathodes is reticulated vitreous carbon or carbon fibre based electrodes such as carbon felt. Another is nickel foam. The cathodic material may be constructed from a fine dispersion of particulate cathodic material, the particulate dispersion being held together by a suitable adhesive, or by a proton conducting polymeric material. The cathode is designed to create maximum flow of catholyte solution to the cathode surface. Thus it may consist of shaped flow regulators or a three dimensional electrode; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

The redox couple flowing in solution in the cathode chamber in operation of the cell is used in the invention as a catalyst for the reduction of oxygen in the regeneration chamber, in accordance with the following (wherein Sp is the redox couple species).

$$O_2 + 4Sp_{red} + 4H^+ \rightarrow 2H_2O + 4SP_{ox}$$

The polyoxometallate redox couple, as well as any other ancillary redox couple, utilised in the fuel cell of the invention should be non-volatile and is preferably soluble in aqueous solvent. Preferred redox couples should react with the oxidant at a rate effective to generate a useful current in the electrical circuit of the fuel cell and react with the oxidant such that water is the ultimate end product of the reaction.

The fuel cell of the invention preferably requires the presence of at least about 0.075M of a polyoxometallate species in the catholyte solution. However, in some circumstances it may also be possible to include other redox couples in the catholyte solution in addition to the polyoxometallate species. There are many suitable examples of such ancillary redox couples, including ligated transition metal complexes and other polyoxometallate species. Specific examples of suitable transition metals ions which can form such complexes include manganese in oxidation states II-V, iron I-IV, copper I-III, cobalt I-III, nickel I-III, chromium (II-VII), titanium II-IV, tungsten IV-VI, vanadium I-V and molybdenum II-VI. Ligands can contain carbon, hydrogen, oxygen, nitrogen, sulphur, halides and/or phosphorus. Ligands may be chelating complexes such as Fe/EDTA and Mn/EDTA, NTA and 2-hydroxyethylenediaminetriacetic acid, or non-chelating such as cyanide. The catholyte solution of the present invention may also be substantially free from any ancilliary redox species other than the vanadium species.

The fuel cell of the invention may operate straightforwardly with a redox couple catalysing in operation of the fuel cell the reduction of oxidant in the cathode chamber. However, in some cases, and with some redox couples, it may be necessary and/or desirable to incorporate a catalytic mediator in the cathode chamber.

Also provided is a catholyte solution for use in a redox fuel cell as outlined above.

Another aspect of the present invention provides the use of a redox fuel cell, as outlined above, wherein during operation, all or part of the fuel cell is maintained at an elevated temperature and/or pressure. The elevated temperature is preferably above 80° C. and is more preferably above 90° C., 100° C. or 110° C. However, the elevated temperature is preferably no more than 120° C. The elevated pressure is preferably above ambient pressure, and more preferably above 0.5 barG, above 0.75 barG, above 1 barG, above 1.25 barG or above 1.5 barG. Elevated pressures of from about 1.5 barG to about 2.5 barG, for example from around 1.75 barG to about 2.25 barG, for example around 2 barG pressure are preferred. The elevated pressure is also preferably below 2.5 barG. In one embodiment, both an elevated temperature and pressure (preferably as defined herein) is used.

The elevated temperature may be in the regeneration zone and/or in the cathode/anode region of the cell. Preferably, the elevated temperature is in the regeneration zone. Further, the elevated pressure may be in the regeneration zone and/or in the cathode/anode region of the cell. Preferably, the elevated pressure is in the regeneration zone.

Also provided is a use of a polyoxometallate in a fuel cell operating at elevated temperatures and/or pressures, wherein the polyoxometallate is as defined above.

BRIEF DESCRIPTION OF THE DRAWINGS

Various aspects of the present invention will now be more particularly is described with reference to the following Figures which illustrate an embodiment of the present invention and Examples demonstrating it.

DETAILED DESCRIPTION OF THE PREFERRED EMBODIMENTS

Figure 1:
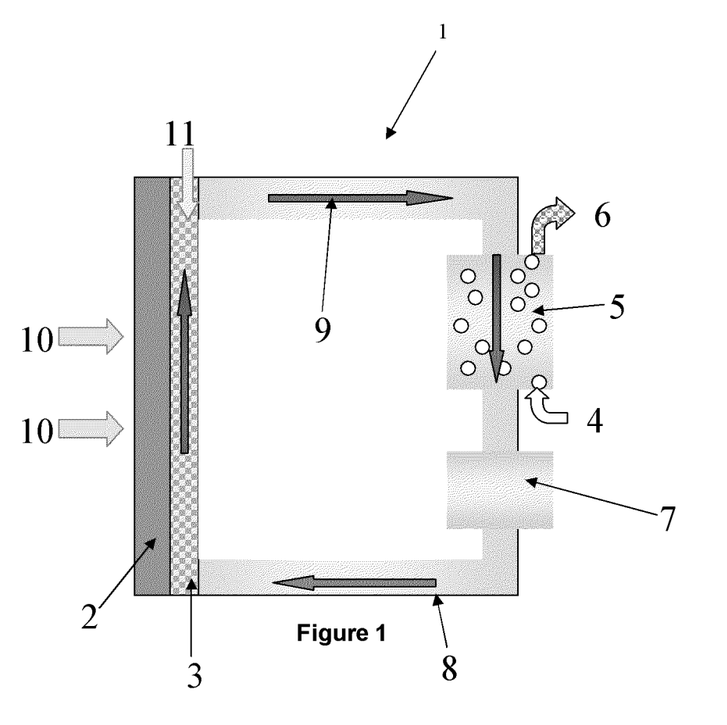
FIG. 1 illustrates a schematic view of the cathode compartment of a fuel cell in accordance with the present invention.

Referring to FIG. 1, there is shown the cathode side of fuel cell 1 in accordance with the invention comprising a polymer electrolyte membrane 2 separating an anode (not shown) from cathode 3. Cathode 3 comprises in this diagram reticulated carbon and is therefore porous. However, other cathodic materials such as platinum may be used. Polymer electrolyte membrane 2 comprises cation selective Nafion 112 membrane through which protons generated by the (optionally catalytic) oxidation of fuel gas (in this case hydrogen) in the anode chamber pass in operation of the cell. Electrons generated at the anode by the oxidation of fuel gas flow in an electrical circuit (not shown) and are returned to cathode 3. Fuel gas (in this case hydrogen) is supplied to the fuel gas passage of the anode chamber (not shown), while the oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (eg water and heat) can be discharged.

A catholyte solution comprising the oxidised form of the polyoxometallate redox catalyst is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then returned to cathode gas reaction chamber 5 via cathode outlet channel 9.

Due to the advantageous composition of the catholyte of the present invention, reoxidation of the catalyst occurs very rapidly, which allows the fuel cell to produce a higher sustainable current than with catholytes of the prior art.

EXAMPLES

Catholyte solutions were prepared i) $Na_4H_3PMo_8V_4O_{40}$; ii) $NaH_6PMo_8V_4O_{40}$; iii) $KH_6PMo_8V_4O_{40}$; iv) $Na_{0.25}K_{0.25}H_{6.8}P_{1.1}Mo_8V_4O_{40.4}$; v) $K_{0.5}H_{9.5}P_2Mo_8V_4O_{44}$. All solutions were made to a concentration of 0.3M.

Under conditions of elevated temperature and/or pressure i) $Na_4H_3PMo_8V_4O_{40}$ is comparative and the other catholyte solutions are all in accordance with the invention.

Each formulation was tested with a new 25 cm2 active area single cell containing a carbon felt electrode at the cathode, a commercially available reinforced 25 μm thick PFSA membrane which is only catalyst coated on the anode side and a gas diffusion layer with a microporous layer at the anode, nominally 300 μm thick. All cells were subjected to leak and short circuit tests prior to commencement of testing.

All catholyte formulations were subjected to a protocol utilising the same test conditions. The anode was run flow through with a hydrogen flow rate of 1 L min-1 with the back pressure set to the half-way point between the catholyte in and out pressure. Catholyte flow through the cathode was set to a flow rate 150 ml min-1. The catholytes were tested first at 80° C. ambient pressure before increasing the pressure applied to regenerator vessel to 3 bar absolute and repeating tests at 80° C. with the increased pressure. Tests were then repeated at 100° C. and 110° C. while continuing to apply 3 bar absolute pressure, before cooling and removing pressure and complete the sequence at 100° C. at ambient pressure. Regeneration occurs in the regenerator vessel where air is bubbled into the catholyte through a stainless steel sparge at 3 L min-1.

I-V curves and constant current operation at 1500 mA cm-2 were recorded for each catholyte at each temperature/pressure combination. I-V curves give a good indication of cell performance but however are at a fixed catholyte redox state and so do not take regeneration of the catholyte into account as there is sufficient catholyte volume (650 mL) in the reservoir to complete the polarisation curve in a single pass. Constant current operation will also take into account the changing redox state the catholyte and what can be sustained for a given current density, dependant on the rate of regeneration of the catholyte.

In all examples, performance improves when pressurising the system i.e. the voltage achieved under load at 80° C., 3 bar absolute is always higher than that achieved with the 80° C. ambient data. This is from both increased regeneration capability and from the increased hydrogen pressure required to balance the differential pressures across the cell. Where the catholytes behave differently is on addition of temperature, the voltage achieved at 1500 mA cm-2 with $Na_4H_3PMo_8V_4O_{40}$ (the comparative example) is almost the same at 80° C. 3 bar absolute as it is at 110° C. 3 bar absolute, showing very little temperature dependency. However for all other solutions the voltage difference achieved when increasing the temperature in this way is significant, with increases between 60-136 mV witnessed for the different formulations.

Figure 2:
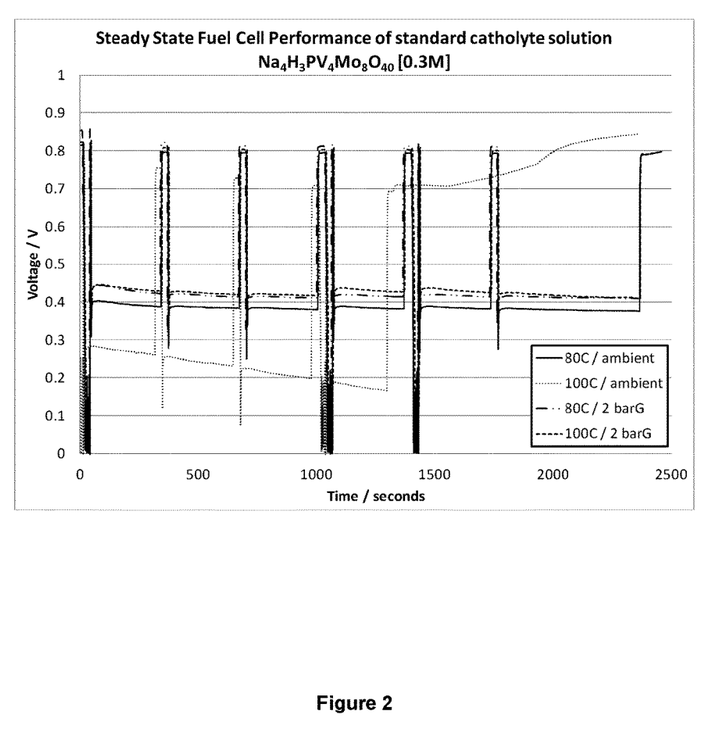
FIG. 2 shows the steady-state fuel cell performance of standard (comparative) POM $Na_4H_3PV_4Mo_8O_{40}$ with variability in operating temperature, pressure, as well as temperature and pressure.

FIG. 2 shows steady-state fuel cell data for a standard catholyte solution, $Na_4H_3PMo_8V_4O_{40}$, and the effects on performance of increased temperature, pressure, as well as temperature and pressure combined (110° C. data omitted because data is unobtainable at that temperature under ambient pressure and there is no noticeable benefit over 100° C. with pressure of 2 barG). The continuous decline in cell voltage at 100° C./ambient pressure did not abate over time and test was abandoned abruptly. The steady-state data shows a significant loss of performance from increasing operating temperature from 80° C. to 100° C. and beyond due to the solubility oxygen at these temperatures limiting reaction rates. The detrimental effect of increasing temperature can be overcome by application of increased pressure; however, the best performing catholyte under standard conditions (i.e not at elevated temperature and pressure; but at 80° C. and ambient pressure) shows an almost negligible improvement in performance (+33 mV at 110° C.; 2 barG) as a result of the application of ETP, FIG. 2 and Table 1.

Figure 3:
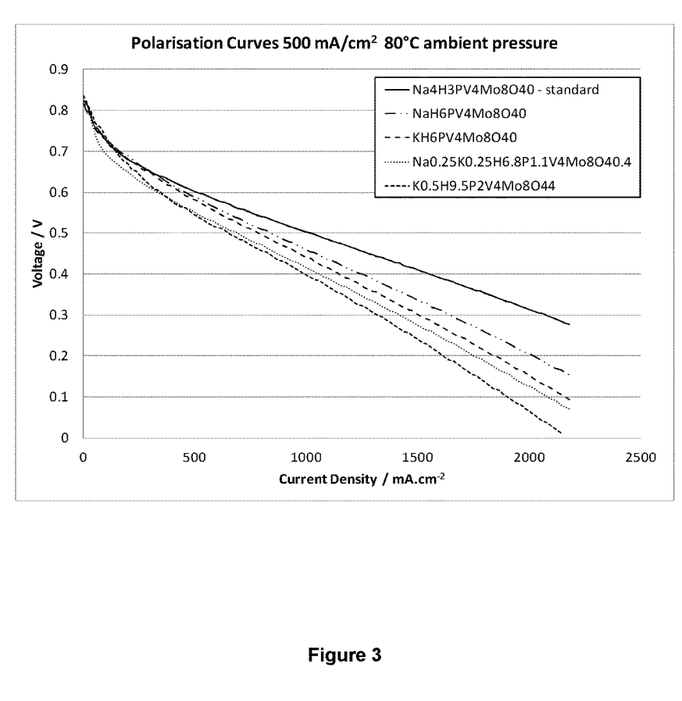
FIG. 3 shows polarisation curves of example catholytes (in accordance with the invention) at 500 mA/cm$^2$; 80° C., ambient pressure. The standard (comparative) catholyte ($Na_4H_3PV_4Mo_8O_{40}$) shows preferred performance under such standard operating conditions.
Figure 4:
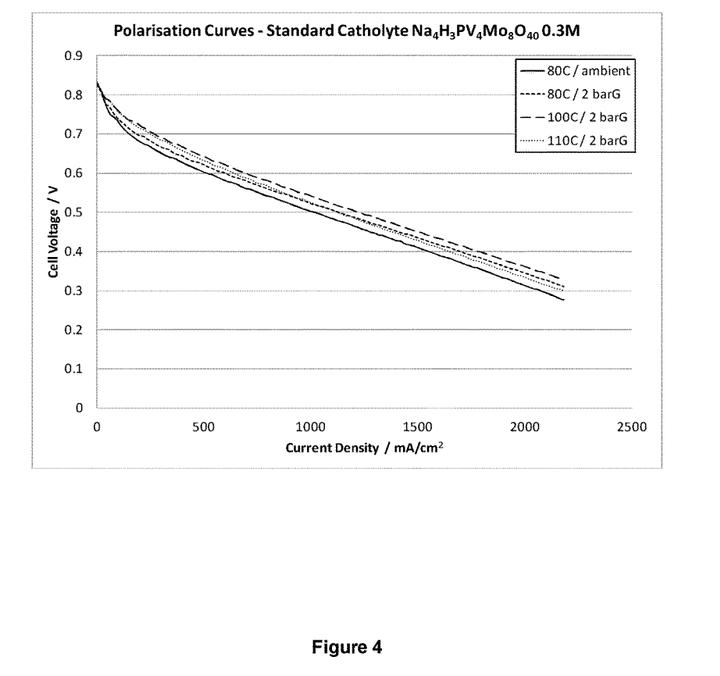
FIG. 4 shows polarisation curves of the standard (comparative) catholyte $Na_4H_3PV_4Mo_8O_{40}$ [0.30M], demonstrating a modest and unsurprising improvement in cell performance as a result of an increase in operating temperature and pressure.
Figure 5:
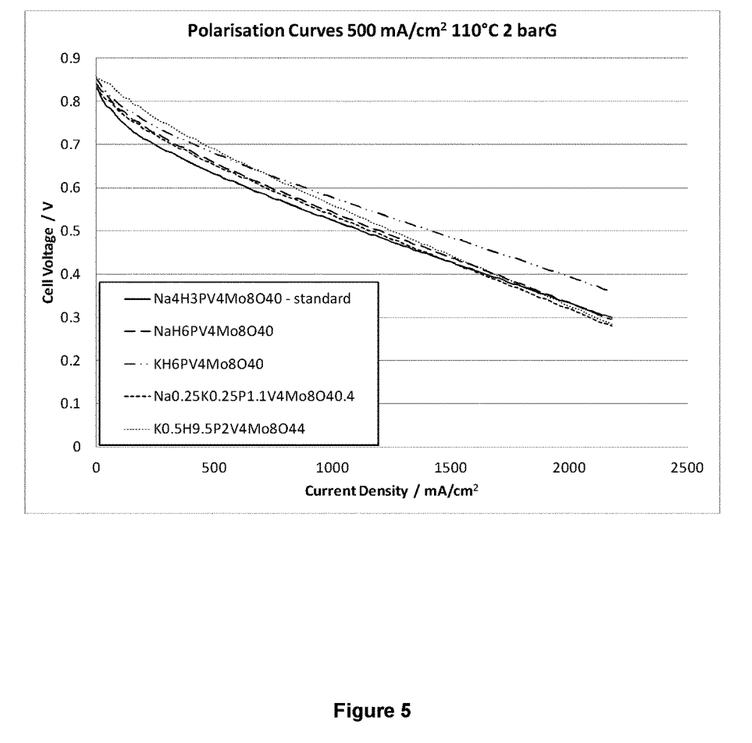
FIG. 5 shows polarisation curves of example catholyte solutions (in accordance with the invention) at 500 mA/s, 110° C., 2 barG pressure. Performance appears to siginificantly favour catholytes of the present invention under conditions described as elevated temperature and pressure. The performance reversal with respect to the comparative catholyte is surprising for the catholytes of the present invention.
Figure 6:
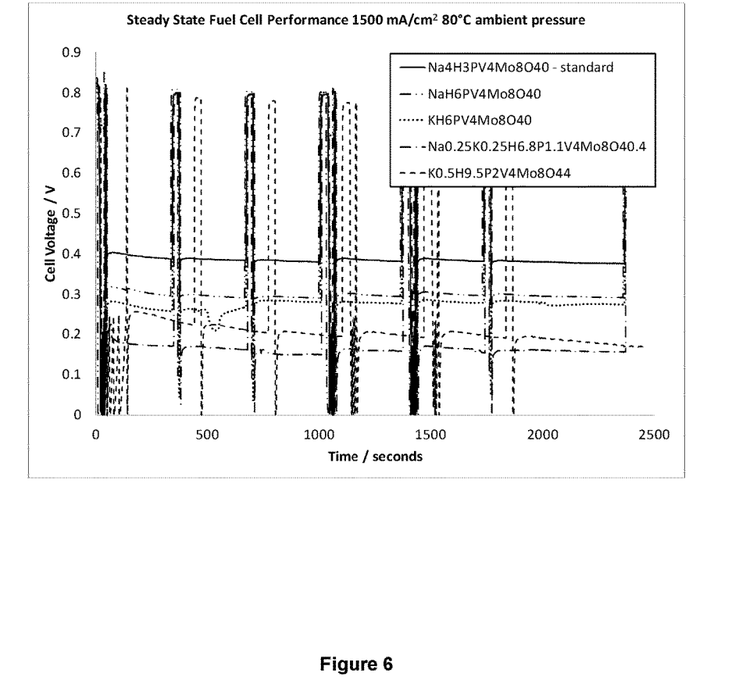
FIG. 6 shows steady-state fuel cell performance of various catholytes in accordance with the invention vs a standard (comparative) catholyte at 1500 mA/cm$^2$, 80° C., ambient pressure. Performance of the standard (comparative) catholyte exceeds those of the present invention under these standard conditions.
Figure 7:
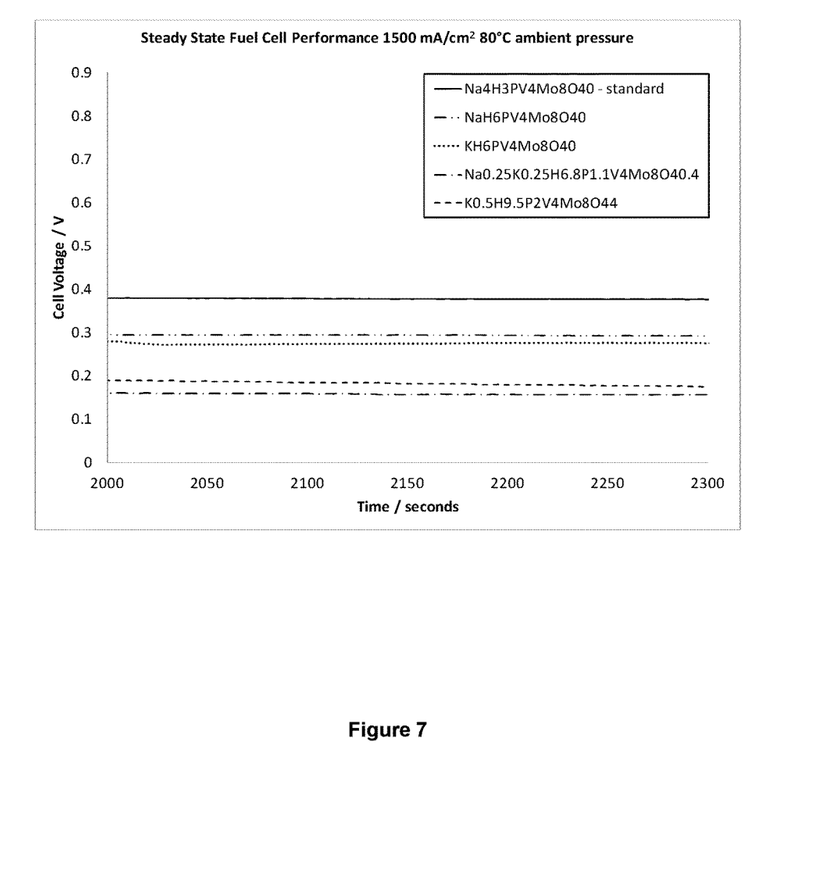
FIG. 7 shows a close up view of part of the data from FIG. 6, showing steady state fuel cell performance of catholytes at 1500 mA/cm2, 80° C., ambient pressure. Performance of the standard (comparative) catholyte exceeds those of the present invention under these standard conditions.
Figure 8:
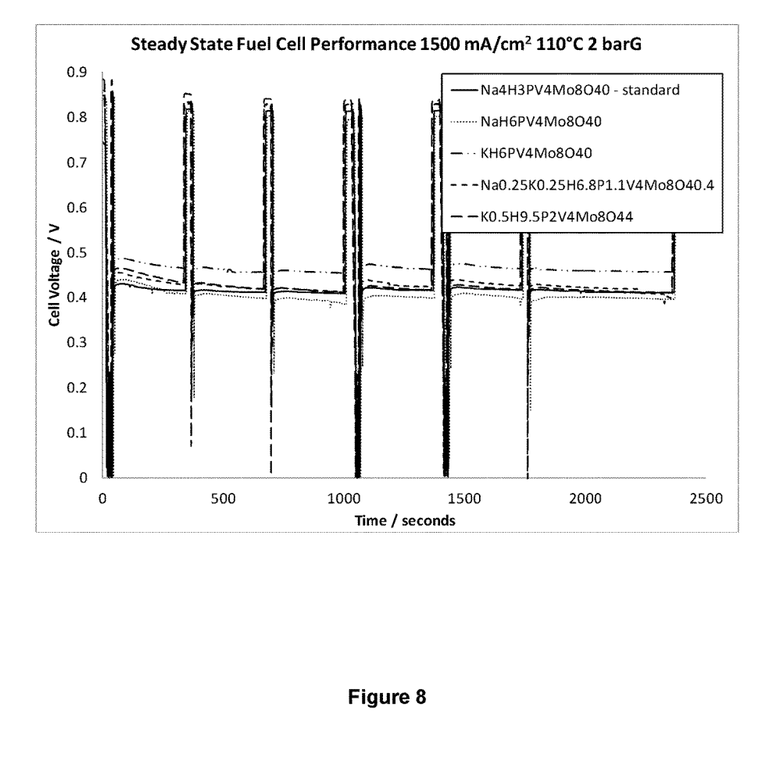
FIG. 8 shows steady-state fuel cell performance of various catholytes in accordance with the invention vs a standard (comparative) catholyte at 1500 mA/cm$^2$, 110° C., 2 barG pressure. Performance improvements of the standard (comparative) catholyte are minimal compared to the type of catholytes investigated in the present invention.
Figure 9:
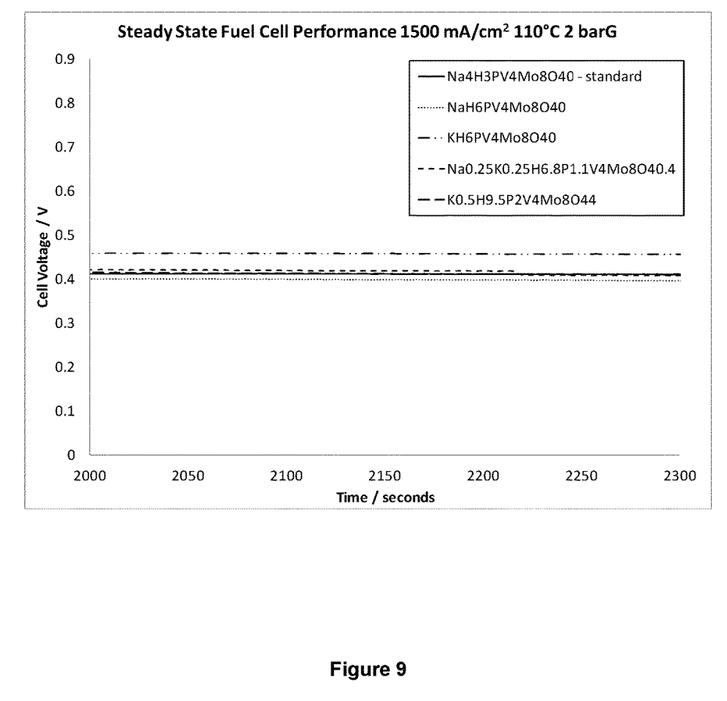
FIG. 9 shows a close up view of part of the date from FIG. 8, showing steady state fuel cell performance of catholytes at 1500 mA/cm2, 110° C., 2 barG. Performance improvements of the catholytes of the present invention are capable of demonstrating superior steady-state performance in addition to the improvement in polarisation curves, FIG. 4, compared to standard catholytes of the prior art, with the application of elevated temperature and pressure.

Fuel cell performance of the standard (comparative) catholyte measured at 80° C. and ambient pressure demonstrates superior current densities when compared against catholytes of the present invention, polarisation curve FIG. 3 and steady state FIG. 6 and FIG. 7. The standard catholyte does demonstrate an improvement in cell performance with application of elevated temperature and pressure, FIG. 4. However, further comparison between the standard catholyte and those of the present invention at ETP shows a reversal in the order of the best performing system, FIG. 5, FIG. 8 and FIG. 9. FIG. 5 shows how previously poor performing catholytes are now preferred at various current densities (for example see 500 mA/cm2 and 1000 mA/cm2) under ETP. This behaviour is further exemplified in steady-state fuel cell performance with catholytes of the present invention showing a more significant improvement in performance to standard catholyte solution which are a direct result of speciation effects of the catholytes of the present invention when utilised in a fuel cell with elevated temperature and pressure, data supplied in brackets Table 1.

TABLE 1

Steady state cell voltage achieved under various operating conditions with catholytes of the present invention compared against the standard performing catholyte.

| Catholyte Formulation | Temp (° C.) | Pressure (barG) | Steady-State Cell Voltage (V) - with ETP performance improvement in brackets |
|---|---|---|---|
| $Na_4H_3PV_4Mo_8O_{40}$ | 80 | 0 | 0.377 |
| $Na_4H_3PV_4Mo_8O_{40}$ | 100 | 0 | 0.202 |
| $Na_4H_3PV_4Mo_8O_{40}$ | 80 | 2 | 0.417 |
| $Na_4H_3PV_4Mo_8O_{40}$ | 100 | 2 | 0.417 |
| $Na_4H_3PV_4Mo_8O_{40}$ | 110 | 2 | 0.410 (+0.033 V) |
| $NaH_6PV_4Mo_8O_{40}$ | 80 | 0 | 0.293 |
| $NaH_6PV_4Mo_8O_{40}$ | 110 | 2 | 0.399 (+0.106 V) |
| $KH_6PV_4Mo_8O_{40}$ | 80 | 0 | 0.277 |
| $KH_6PV_4Mo_8O_{40}$ | 110 | 2 | 0.458 (+0.181 V) |
| $Na_{0.25}K_{0.25}H_{6.8}P_{1.1}V_4Mo_8O_{40.4}$ | 80 | 0 | 0.158 |
| $Na_{0.25}K_{0.25}H_{6.8}P_{1.1}V_4Mo_8O_{40.4}$ | 110 | 2 | 0.419 (+0.261 V) |
| $K_{0.5}H_{9.5}P_2V_4Mo_8O_{44}$ | 80 | 0 | 0.180 |
| $K_{0.5}H_{9.5}P_2V_4Mo_8O_{44}$ | 110 | 2 | 0.412 (+0.232 V) |

These data demonstrate that whilst increasing the temperature and pressure of operation produces a marginal improvement in a standard prior art POM catholyte, the magnitude of that improvement is very much formulation dependant, and is much greater and surprisingly so for the catholyte systems under the conditions as stipulated in the present invention which include vanadium and an amount of a non-hydrogen cation, and wherein the molar ratio of the non-hydrogen cation to vanadium is more than 0 and less than 1.

What is claimed is:

1. A redox fuel cell comprising an anode and a cathode separated by an ion selective polymer electrolyte membrane; means for supplying a fuel to the anode region of the cell; means for supplying an oxidant to the cathode region of the cell; means for providing an electrical circuit between the anode and the cathode; a non-volatile catholyte solution flowing in fluid communication with the cathode, the catholyte solution comprising a polyoxometallate redox couple being at least partially reduced at the cathode in operation of the cell, and at least partially re-generated by reaction with the oxidant in a regeneration zone after such reduction at the cathode, the catholyte solution further comprising one or more vanadium species that result from the speciation of the polyoxometallate at an elevated temperature and an elevated pressure, which is from 0.5 barG to 2.0 barG, wherein the polyoxometallate is represented by the formula:

$$X_a[Z_bM_cO_d]$$

wherein:
X is selected from hydrogen, alkali metals, alkaline earth metals, ammonium, transition metal ions and combinations of two or more thereof;
Z is selected from B, P, S, As, Si, Ge, Ni, Rh, Sn, Al, Cu, I, Br, F, Fe, Co, Cr, Zn, H2, Te, Mn and Se and combinations of two or more thereof;
M comprises vanadium and optionally one or more of Mo, W, Nb, Ta, Mn, Fe, Co, Cr, Ni, Zn Rh, Ru, Tl, Al, Ga, In and other metals selected from the 1st, 2nd and 3rd transition metal series and the lanthanide series and combinations of two or more thereof;
a is a number of X necessary to charge balance the $[Z_bM_cO_d]$ anion;
b is from 0 to 20;
c is from 1 to 40;
d is from 1 to 180; and wherein
X includes an amount of a non-hydrogen cation and the molar ratio of the non-hydrogen cation to vanadium is more than 0 and less than 1.

2. The redox fuel cell according to claim 1 wherein the molar ratio of the non-hydrogen cation to vanadium is less than 0.75.

3. The redox fuel cell according to claim 1 wherein:
b is from 1 to 5;
c is from 5 to 20;
d is from 30 to 70; and
Z consists of phosphorus.

4. The redox fuel cell according to claim 1 wherein M consists of vanadium and either molybdenum or tungsten.

5. The redox fuel cell according to claim 4 wherein the molar ratio of molybdenum or tungsten to vanadium is 2:1.

6. The redox fuel cell according to claim 1 containing from 2 to 10 vanadium centres in the polyoxometallate.

7. The redox fuel cell according to claim 1 wherein X comprises a combination of hydrogen and alkali metal and/or alkaline earth metal ions.

8. The redox fuel cell according to claim 1 wherein X comprises more than one type of non-hydrogen cation.

9. The redox fuel cell according to claim 8 wherein the total molar ratio of all of the non-hydrogen cations to vanadium is more than 0 and less than 1.

10. The redox fuel cell according to claim 8 wherein the molar ratio of each of the non-hydrogen cations to vanadium is more than 0 and less than 1.

11. The redox fuel cell according to claim 1 wherein the polyoxometallate is
$KH_6PV_4Mo_8O_{40}$;
$NaH_6PV_4Mo_8O_{40}$;
$K_{0.5}H_{9.5}P_2V_4Mo_8O_{44}$; or
$Na_{0.25}K_{0.25}H_{6.8}P_{1.1}V_4Mo_8O_{40.4}$.

12. The redox fuel cell according to claim 1 wherein the speciation of the polyoxometallate occurs in situ.

13. The redox fuel cell according to claim 1 wherein the elevated temperature is above 80° C.

14. The redox fuel cell according to claim 1 wherein the elevated temperature is no more than 120° C.

15. The redox fuel cell according to claim 1 wherein the elevated temperature is below the boiling point for the catholyte solution.

16. The redox fuel cell according to claim 1 wherein the cell is maintained in operation at elevated temperature in the regeneration zone and/or in the cathode/anode region of the cell.

17. The redox fuel cell according to claim 16 wherein the elevated temperature is in the regeneration zone.

18. The redox fuel cell according to claim 1 wherein the cell is maintained in operation at elevated pressure in the regeneration zone and/or in the cathode/anode region of the cell.

19. The redox fuel cell according to claim 18 wherein the elevated pressure is in the regeneration zone.

20. The redox fuel cell according to claim 1 maintained in operation at both an elevated temperature and at an elevated pressure.

21. The redox fuel cell according to claim 1 wherein the catholyte solution comprises at least one ancillary redox species.

22. The redox fuel cell according to claim 21 wherein the ancillary redox species is selected from ligated transition metal complexes, further polyoxometallate species, and combinations thereof.

23. The redox fuel cell according to claim 22 wherein the transition metal(s) in the transition metal complexes are selected from manganese in oxidation states II-V, iron I-IV, copper I-III, cobalt I-III, nickel I-III, chromium (II-VII), titanium II-IV, tungsten IV-VI, vanadium II-V and molybdenum II-VI.

24. The redox fuel cell according to claim 1 wherein the catholyte solution is substantially free from any ancillary redox species, other than the vanadium species.

25. A catholyte solution for use in a redox fuel cell according to claim 1.

26. A method for operating the fuel cell according to claim 1 comprising maintaining all or part of the fuel cell, during operation, at an elevated temperature and/or pressure.

27. The method according to claim 26 wherein the elevated temperature is above 80° C.

28. The method according to claim 26 wherein the elevated temperature is no more than 120° C.

29. The method according to claim 26 wherein the elevated temperature is in the regeneration zone and/or in the cathode/anode region of the cell.

30. The method according to claim 29 wherein the elevated temperature is in the regeneration zone.

31. The method according to claim 26 wherein the elevated pressure is in the regeneration zone and/or in the cathode/anode region of the cell.

32. The method according to claim 31 wherein the elevated pressure is in the regeneration zone.

33. The method according to claim 26 wherein both an elevated temperature and pressure are used.

34. The method according to claim 26, wherein the polyoxometallate is $KH_6PV_4Mo_8O_{40}$;

$NaH_6PV_4Mo_8O_{40}$;

$K_{0.5}H_{9.5}P_2V_4Mo_8O_{44}$; or $Na_{0.25}K_{0.25}H_{6.8}P_{1.1}V_4Mo_8O_{40.4}$.

35. An automotive system, electronic device, combined heat and power (chp) system or other useful article or system incorporating the fuel cell of claim 1.

* * * * *